(12) United States Patent
Winchell

(10) Patent No.: US 7,017,436 B2
(45) Date of Patent: Mar. 28, 2006

(54) BOOT ASSEMBLY FOR A VEHICLE

(75) Inventor: Stephen K. Winchell, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 220 days.

(21) Appl. No.: 10/268,404

(22) Filed: Oct. 10, 2002

(65) Prior Publication Data

US 2004/0069079 A1    Apr. 15, 2004

(51) Int. Cl.
*F16J 15/50* (2006.01)
*B60K 20/00* (2006.01)
*B62D 25/20* (2006.01)
*E21B 33/10* (2006.01)

(52) U.S. Cl. .................... 74/18.1; 74/18.2; 74/473.36; 74/543; 74/608; 180/90.6; 277/636

(58) Field of Classification Search ........ 277/634–636, 277/637, 644; 180/90.6; 74/608, 609, 612, 74/18, 18.1, 18.2, 473.36, 543, 566, 558, 74/558.5
See application file for complete search history.

(56) References Cited

U.S. PATENT DOCUMENTS

| | | | | |
|---|---|---|---|---|
| 2,305,265 A | * | 12/1942 | Le Tourneau | 277/634 |
| 3,086,609 A | * | 4/1963 | Bryant, Jr. | 180/90.6 |
| 4,229,010 A | * | 10/1980 | St. Laurent, Jr. | 277/634 |
| 4,522,081 A | * | 6/1985 | Mackin et al. | 74/473.36 |
| 4,527,803 A | * | 7/1985 | Rose | 277/315 |
| 4,558,463 A | * | 12/1985 | Boyd | 383/75 |
| 4,991,457 A | * | 2/1991 | Chen | 74/473.36 |
| 5,876,149 A | * | 3/1999 | Dorr et al. | 403/134 |
| 5,941,123 A | * | 8/1999 | Numakami | 74/18.1 |
| 6,089,574 A | * | 7/2000 | Sadr et al. | 277/636 |
| 6,234,044 B1 | * | 5/2001 | Slon et al. | 74/566 |
| 6,464,233 B1 | * | 10/2002 | Oetiker | 277/636 |
| 6,533,288 B1 | * | 3/2003 | Brandner et al. | 277/630 |
| 6,550,350 B1 | * | 4/2003 | Martin | 74/18.2 |
| 2004/0234175 A1 | * | 11/2004 | Takita et al. | 383/905 |

* cited by examiner

*Primary Examiner*—Richard W. Ridley
*Assistant Examiner*—Colby Hansen
(74) *Attorney, Agent, or Firm*—Laure C. Hargitt

(57) ABSTRACT

A boot assembly for a vehicle includes a retainer adapted to be connected to vehicle structure of a vehicle and a boot for surrounding either one of a shifter and parkbrake of the vehicle. The boot assembly also includes a seal connected to the boot and to the retainer to prevent the boot from exiting the retainer.

16 Claims, 4 Drawing Sheets

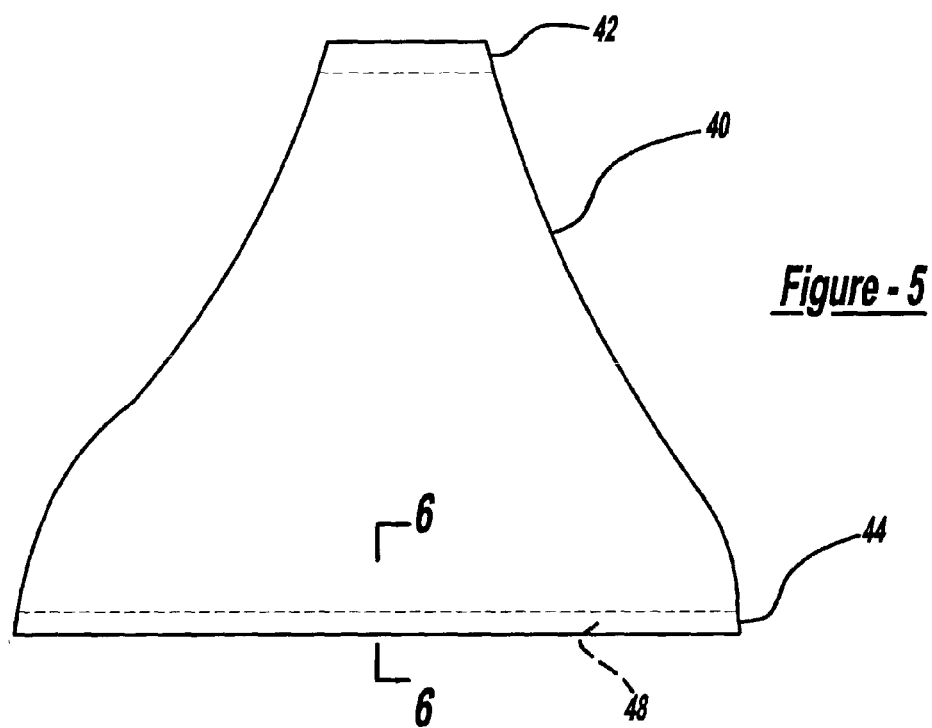
*Figure - 5*
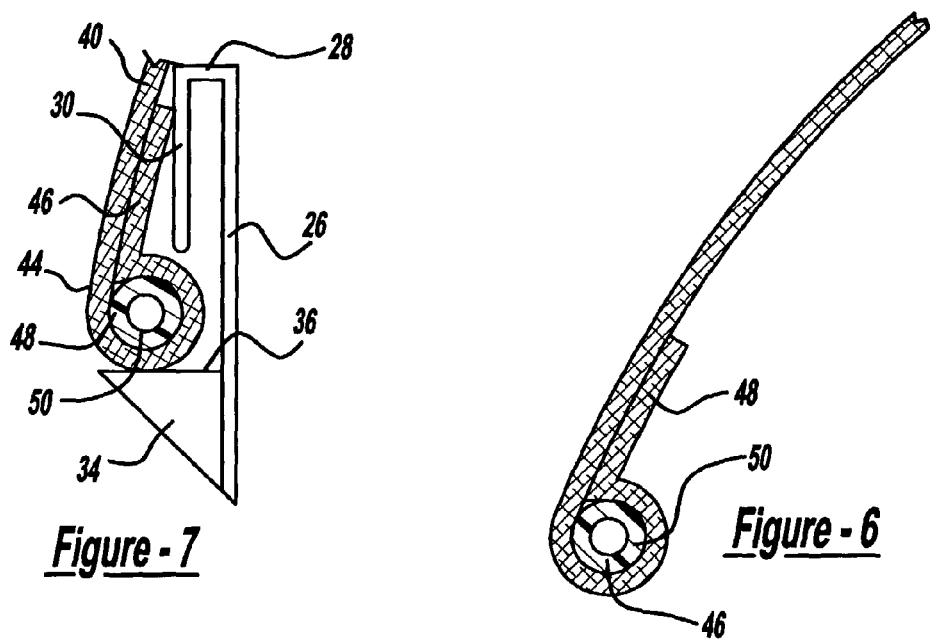
*Figure - 7*
*Figure - 6*

US 7,017,436 B2

BOOT ASSEMBLY FOR A VEHICLE

TECHNICAL FIELD

The present invention relates generally to boots for shifters/parkbrakes in vehicles and, more particularly, to a fastenerless boot assembly for a shifter/parkbrake of a vehicle.

BACKGROUND OF THE INVENTION

It is known to provide a boot for a shifter/parkbrake in a vehicle. Typically, the shifter/parkbrake boots are attached to a retainer by a mechanical attachment system such as clips, staples, adhesive, etc. The retainer is typically attached to a center console by a plurality of individual screws extending through the retainer and engaging separate individual nuts, which are disposed in recesses in the center console. However, conventional applications require an additional process or processes to introduce mechanical fastening for the boot to the retainer.

As a result, it is desirable to provide a new fastenerless boot assembly for a vehicle. It is also desirable to provide a fastenerless boot assembly that snaps-in for the vehicle. It is further desirable to provide a fastenerless boot assembly that eliminates the need for mechanical fasteners. Therefore, there is a need in the art to provide a fastenerless boot assembly for a vehicle that meets these desires.

SUMMARY OF THE INVENTION

It is, therefore, one object of the present invention to provide a new fastenerless boot assembly for a vehicle.

It is another object of the present invention to provide a fastenerless boot assembly for a vehicle that eliminates mechanical fastening.

To achieve the foregoing objects, the present invention is a fastenerless boot assembly for a vehicle. The fastenerless boot assembly includes a retainer adapted to be connected to vehicle structure of a vehicle and a boot for surrounding either one of a shifter and parkbrake of the vehicle. The fastenerless boot assembly also includes a seal connected to the boot and to the retainer to prevent the boot from exiting the retainer.

One advantage of the present invention is that a fastenerless boot assembly is provided for a vehicle. Another advantage of the present invention is that the fastenerless boot assembly incorporates an o-ring for attachment and uses no fasteners per se, eliminating the need for any machinery for fastening or gluing plus the fastening material itself. Yet another advantage of the present invention is that the fastenerless boot assembly eliminates mechanical fastening equipment and components. Still another advantage of the present invention is that the fastenerless boot assembly has an assembly process that is simple, fast, efficient, and durable. A further advantage of the present invention is that the fastenerless boot assembly has repeatability and ease of assembly.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 5 is an elevational view of a boot of the fastenerless boot assembly of FIG. 1.

FIG. 6 is a sectional view taken along line 6—6 of FIG. 5.

FIG. 7 is a fragmentary elevational view of the fastenerless boot assembly of FIG. 1.

DESCRIPTION OF THE PREFERRED EMBODIMENT

Figure 1:
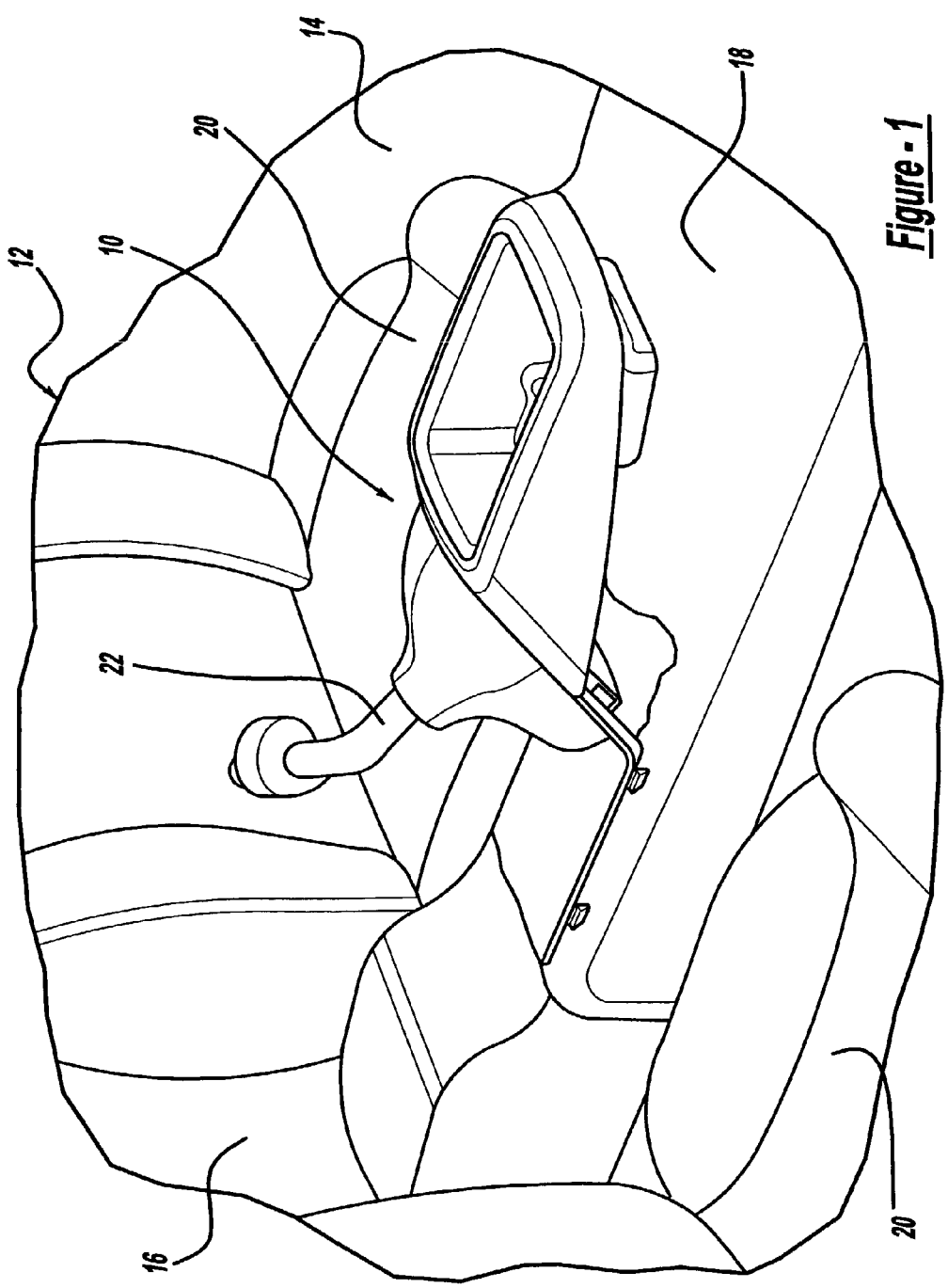
FIG. 1 is a perspective view of a fastenerless boot assembly, according to the present invention, illustrated in operational relationship with a vehicle.
Figure 2:
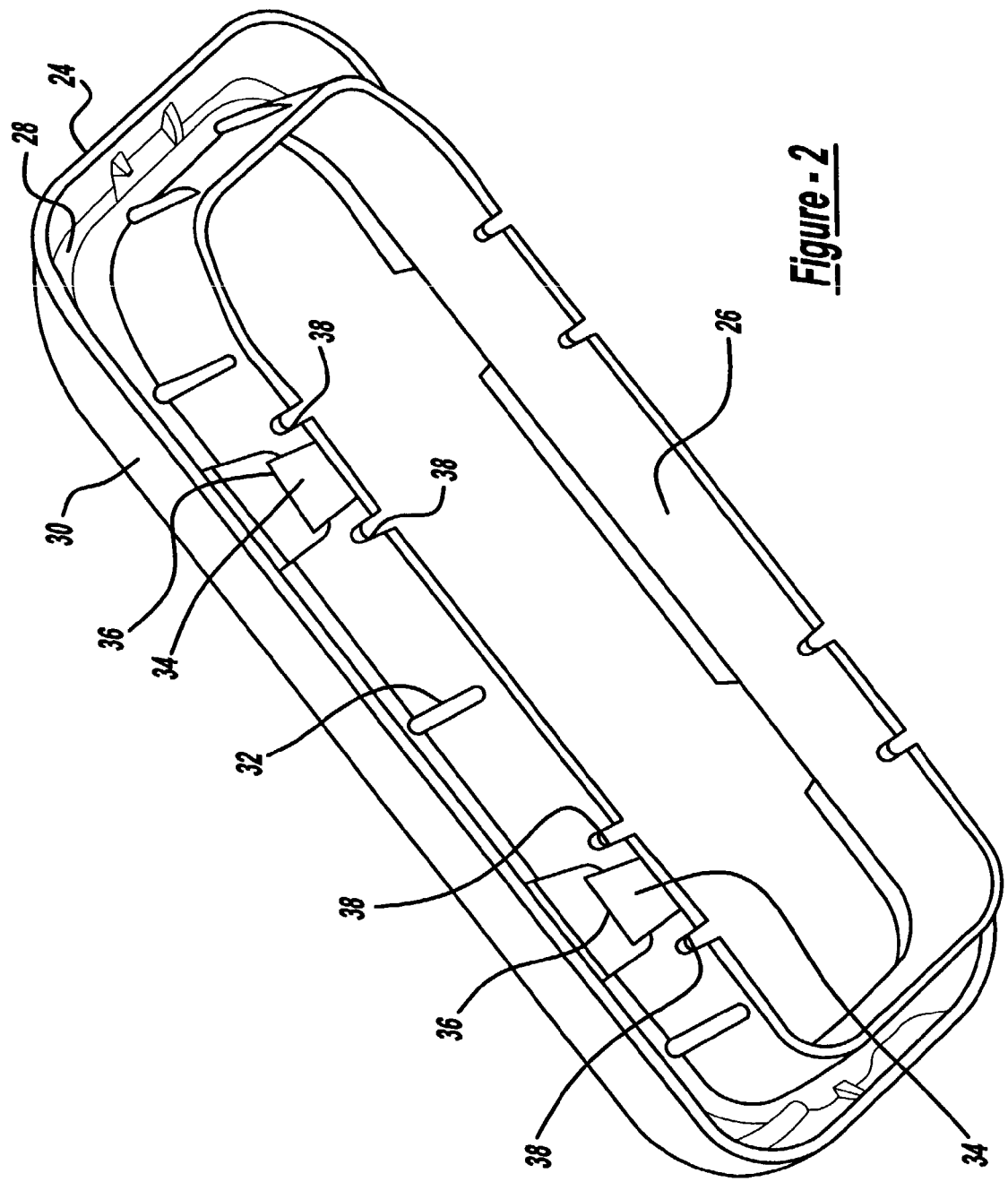
FIG. 2 is a perspective view of a retainer of the fastenerless boot assembly of FIG. 1.
Figure 3:
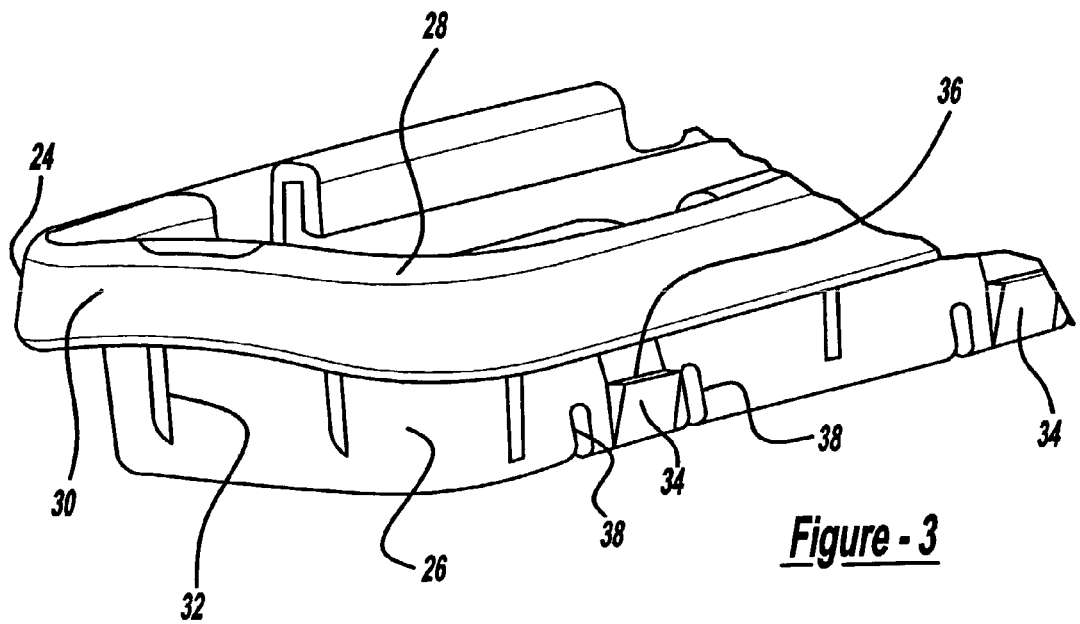
FIG. 3 is a partial perspective view of a retainer of the fastenerless boot assembly of FIG. 1.
Figure 4:
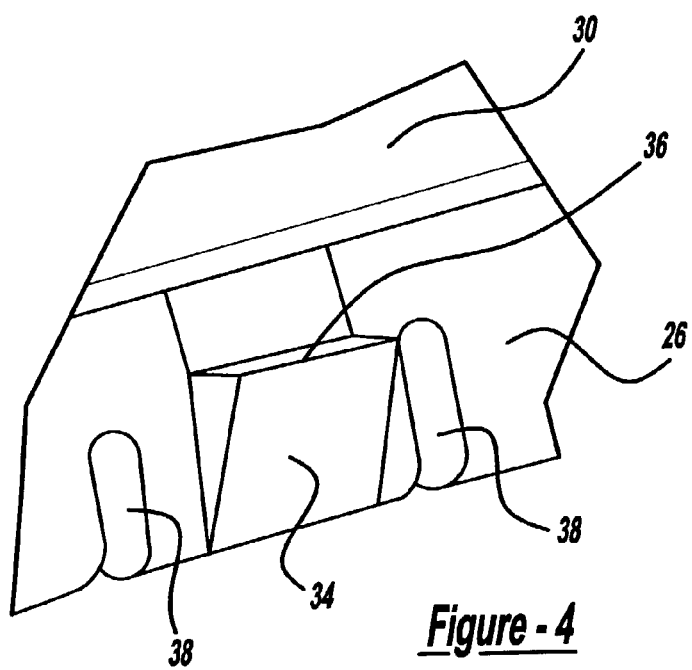
FIG. 4 is an enlarged perspective view of a portion of a retainer of the fastenerless boot assembly of FIG. 1.

Referring to the drawings and in particular FIG. 1, one embodiment of a fastenerless boot assembly 10, according to the present invention, is shown for a vehicle, generally indicated at 12. The vehicle 12 includes a vehicle body 14 forming an occupant compartment 16 therein. The vehicle 12 includes a center console 18 disposed between seats 20 in the occupant compartment 16 and connected to the vehicle body 14 by suitable means (not shown). The vehicle 12 further includes a shifter 22 extending through the center console 18 and connected to a transmission (not shown). The shifter 22 is surrounded by the fastenerless boot assembly 10 to be described. It should be appreciated that the fastenerless boot assembly 10 may surround a parkbrake (not shown) instead of the shifter 22. It should also be appreciated that, except for the fastenerless boot assembly 10, the vehicle 12 is conventional and known in the art.

Referring to FIGS. 2 through 6, the fastenerless boot assembly 10 includes a retainer 24. The retainer 24 is generally rectangular in shape and has a side wall 26 and a top wall 28 extending generally perpendicularly from one end of the side wall 26. The retainer 24 also has an exterior wall 30 extending generally perpendicular from the top wall 28 and generally parallel to the side wall 26. The exterior wall 30 is spaced from the side wall 26 and has a length less than a length of the side wall 26. The side wall 26 includes at least one, preferably a plurality of wall ribs 32 extending outwardly therefrom. The side wall 26 also includes at least one, preferably a plurality of clip ribs 34 extending outwardly. The clip ribs 34 have a generally triangular cross-sectional shape and are inverted to provide a generally planar retention surface 36. The side wall 26 further includes at least one, preferably a plurality of slots 38 extending therein. One of the slots 38 is located on each side of the clip ribs 34 to allow the clip ribs 34 to flex inwardly and return to their original position. The retainer 24 is made of a rigid material, preferably a plastic material. The retainer 24 is a monolithic structure being integral, unitary, and one-piece.

The fastenerless boot assembly 10 also includes a boot 40 to surround a portion of the shifter 22. The boot 40 is generally annular and trapezoidal in shape. The boot 40 has an upper end 42 and a lower end 44. The lower end 44 has a channel 46 extending therein formed by a portion or hem 48 of the boot 40 connected to itself by suitable means such as an adhesive or stitching. The boot 40 is made of a flexible material, preferably an elastomeric material. It should be appreciated that the upper end 42 may also include a hem 48.

The fastenerless boot assembly 10 further includes a seal 50 such as an o-ring disposed in the channel of the lower end 44 of the boot 40. The seal 50 has a generally circular cross-sectional shape and may be solid or hollow. The seal 50 is made of a flexible material, such as an elastomeric material. It should be appreciated that the size of the boot 40 and subsequent size of the seal 50 are determined by the size of the retainer 24 required to properly close out the shifter 22. It should be appreciated that the seal 50 is conventional and known in the art.

In operation, an assembly person (not shown) inserts the retainer 24 into the boot 40 vertically and twists the retainer 24 to its design plane within the boot 40. The seal 50 stretches sufficiently to allow the twisting required to load the retainer 24. The lower end 44 of the boot 40 is disposed between the retention surface 36 of the clip ribs 34 and the exterior wall 30 of the retainer 24 as illustrated in FIG. 7. Once the retainer 24 is twisted to the correct orientation, the assembly is complete. It should be appreciated that the seal 50 prevents the boot 40 from pulling past the retainer 24 and no other fastening is required. It should also be appreciated that the process requires stitching of the seal 50 into the lower end 44 of the boot 40, but this is in addition to stitching that is already being performed so it is not an additional operation.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A vehicle boot assembly comprising:
    a retainer adapted to be connected w vehicle structure of a vehicle;
    a boot for surrounding either one of a shifter and a parkbrake of the vehicle; and
    a flexible material seal connected to said boot to form an enlarged end on said boot having a thickness greater than a thickness of a remainder of said boot, wherein said seal is stretched and said enlarged end is disposed in a recess formed between a fixed portion of said retainer and a movable portion of said retainer to prevent said boot from exiting said retainer, wherein said boot has a channel therein, said seal being disposed in said channel, and wherein said boot has a hem in the lower end, said hem forming said channel.

2. A vehicle boot assembly as set forth in claim 1 wherein said seal comprises an o-ring.

3. A vehicle boot assembly as set forth in claim 1 wherein said seal is made of an elastomeric material.

4. A vehicle boot assembly as set forth in claim 1 wherein said retainer comprises a side wall, a top wall extending generally perpendicular from said side wall, and an exterior wall being fixed and extending generally perpendicular to and downwardly from said top wall.

5. A vehicle boot assembly as set forth in claim 4 wherein said side wall includes at least one clip rib having a retention surface and being movable to form the movable portion of said retainer, said enlarged end being disposed between said retention surface and said exterior wall.

6. A vehicle boot assembly as set forth in claim 5 wherein said side wall includes a slot on each side of said at least one clip rib to allow said at least one clip rib to flex.

7. A vehicle boot assembly as set forth in claim 1 wherein said boot has an upper end and a lower end, said seal being connected to said lower end to form said enlarged end.

8. A vehicle boot assembly as set forth in claim 1 wherein said boot is made of a flexible material.

9. An assembly comprising:
    a console of a vehicle having either one of a shifter and a parkbrake extending therethrough;
    a retainer surrounding the one of said shifter and said parkbrake and connected to said console;
    a boot surrounding the one of said shifter and said parkbrake; and
    a flexible material seal connected to said boot to form an enlarged end having generally circular cross-sectional shape, wherein said seal is stretched and said enlarged end is disposed in a recess between a fixed portion of said retainer and a movable portion of said retainer to prevent said boot from exiting said retainer, wherein said boot has a channel therein, said seal being disposed in said channel, and wherein said boot has a hem in the lower end, said hem forming said channel.

10. An assembly as set forth in claim 9 wherein said seal comprises an o-ring.

11. An assembly as set forth in claim 9 wherein said seal is made of an elastomeric material.

12. An assembly as set forth in claim 9 wherein said retainer comprises a side wall, a top wall extending generally perpendicular from said side wall, and an exterior wall being fixed and extending generally perpendicular to and downwardly from said top wall.

13. An assembly as set forth in claim 12 wherein said side wall includes at least one clip rib having a retention surface and being movable to form the movable portion of said retainer, said enlarged end being disposed between said retention surface and said exterior wall.

14. An assembly as set forth in claim 13 wherein said side wall includes a slot on each side of said at least one clip rib to allow said at least one clip rib to flex.

15. An assembly as set forth in claim 9 wherein said boot has an upper end and a lower end, said seal being connected to said lower end to form said enlarged end.

16. An assembly for a vehicle comprising:
    a center console of a vehicle having either one of a shifter and a parkbrake extending therethrough;
    a retainer surrounding the one of said shifter and said parkbrake and connected to said center console, said retainer comprising a side wall, a top wall extending generally perpendicular from said side wall, and an exterior wall being fixed and extending generally perpendicular to and downwardly from said top wall, said side wall including at least one clip rib having a retention surface, said clip rib being movable inwardly;
    a boot surrounding the one of said shifter and said parkbrake, said boot having an upper end and a lower end, said lower end having a hem forming a channel; and
    an o-ring disposed in said channel in said lower end of said boot such that said lower end of said boot forms an enlarged diameter end having a generally circular cross-sectional shape, said o-ring being stretched and said clip rib being moved inwardly such that said enlarged diameter end is disposed between said retention surface of said clip rib and said exterior wall to prevent said boot from exiting said retainer.

* * * * *